(12) United States Patent
Bruekers et al.

(10) Patent No.: US 7,152,161 B2
(45) Date of Patent: Dec. 19, 2006

(54) WATERMARKING

(75) Inventors: Alphons Antonius Maria Lambertus Bruekers, Eindhoven (NL); Jaap Andre Haitsma, Eindhoven (NL); Antonius Adrianus Cornelis Maria Kalker, Eindhoven (NL); Minne Van Der Veen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 963 days.

(21) Appl. No.: 10/139,182

(22) Filed: May 6, 2002

(65) Prior Publication Data

US 2003/0004589 A1 Jan. 2, 2003

(30) Foreign Application Priority Data

May 8, 2001 (EP) .................... 01201686

(51) Int. Cl.
*H04L 9/00* (2006.01)
*G06K 9/36* (2006.01)
(52) U.S. Cl. .................. 713/176; 382/277; 382/280
(58) Field of Classification Search ........... 380/201, 380/203–205
See application file for complete search history.

(56) References Cited

U.S. PATENT DOCUMENTS

| | | | | |
|---|---|---|---|---|
| 5,930,369 A * | 7/1999 | Cox et al. | ................ | 713/176 |
| 6,330,672 B1 * | 12/2001 | Shur | ................ | 713/176 |
| 6,425,082 B1 * | 7/2002 | Matsui et al. | ................ | 713/176 |
| 6,674,876 B1 * | 1/2004 | Hannigan et al. | ................ | 713/176 |
| 6,690,812 B1 * | 2/2004 | Reefman et al. | ................ | 382/100 |
| 6,738,744 B1 * | 5/2004 | Kirovski et al. | ................ | 704/273 |
| 6,952,774 B1 * | 10/2005 | Kirovski et al. | ................ | 713/176 |
| 2002/0107691 A1 * | 8/2002 | Kirovski et al. | ................ | 704/270 |
| 2004/0204943 A1 * | 10/2004 | Kirovski et al. | ................ | 704/273 |
| 2005/0108542 A1 * | 5/2005 | Kirovski et al. | ................ | 713/176 |

\* cited by examiner

*Primary Examiner*—Ayaz Sheikh
*Assistant Examiner*—Michael A Cervone
(74) *Attorney, Agent, or Firm*—Larry Lieberchuk

(57) ABSTRACT methods of embedding and detecting a watermark in an information signal (x(n), y'(n)) which are robust against sampling rate conversions of the watermarked signal (y(n)) adapts frame lengths used by an embedder and the detector, respectively, so as to preserve a constant ratio between the respective sampling rate and frame length. The frame lengths may be calculated from a greatest common divisor of a set of sampling rates providing watermarks which are robust against sampling rate conversions between any sampling rates of the set of sampling rates.

13 Claims, 2 Drawing Sheets

WATERMARKING

This invention relates to embedding a watermark in an information signal. The invention further relates to detecting a watermark embedded in an information signal.

In recent years, an increasing trend towards the use and distribution of digital multimedia data has led to an increased need for adequate copy protection, copyright protection, and ownership verification of such data.

Digital watermarking is an emerging technology that may be used for a variety of purposes, such as proof of copyright ownership, tracing of illegal copies, controlling copy control equipment, broadcast monitoring, authenticity verification, adding auxiliary information into multimedia signals, etc.

A watermark is a label which is embedded in an information signal by slightly modifying samples of the signal. Preferably, a watermarking scheme should be designed such that the watermark is imperceptible, i.e. that it does not affect the quality of the information signal significantly. In many applications, the watermark should further be robust, i.e. it should still be reliably detectable after possible signal processing operations.

Though many schemes of watermarking of still images and video have been published, there is relatively little literature on audio watermarking. Most of the published techniques employ methods such as echo-hiding or noise addition, exploiting temporal and/or spectral masking models of the human auditory system.

A watermark may be embedded in an information signal by segmenting an information signal into frames via rectangular window functions, Fourier transforming the individual frames, slightly modifying the resulting Fourier components of each of the frames, and inverse Fourier transforming the modified coefficients, resulting in a watermark signal in the time domain. Finally, the watermark signal is scaled and added to the information signal.

However, in this and other watermarking schemes the detection of the watermark is sensitive to differences in the sampling rates of the information signal during the embedding and the detection of the watermark. In the field of digital audio signals, for example, a considerable number of sampling rates are commonly used in e.g. CD players, speech applications, etc. Consequently, a watermarked information signal may be subject to a sampling rate conversion process which changes the sampling rate of the information signal. However, if the detection algorithm operates at a different sample frequency than the embedder, the watermark detection may fail.

It is known that the detection algorithm may compensate for a sampling rate conversion by reconverting the sampling rate to the original sampling rate used in the embedder.

This prior art method involves the disadvantage that high quality sampling rate conversion is a complex process which requires considerable computational effort, thereby increasing the cost of a product. A low quality sampling rate conversion, on the other hand, may result in a decreased watermark detection reliability. Consequently, a sampling rate re-conversion as a part of the detection algorithm is an undesirable process.

The above and other problems are solved by a method of embedding a watermark in an information signal sampled at a first sampling rate, in which the watermark is to be detected at at least a second sampling rate, the method comprising the steps of generating a representation of the watermark corresponding to a frequency spectrum having predetermined values indicative of the watermark at a set of frequencies corresponding to integral multiples of a scaling factor; and embedding the representation of the watermark in the information signal; wherein the scaling factor is derived from a first common divisor of a predetermined set of sampling rates comprising the first and second sampling rates, divided by a predetermined integral factor.

Consequently, the method according to the invention provides a watermarking scheme which is robust against sampling rate conversions between the sampling rates in the predetermined set of sampling rates.

The method utilises the fact that the frequencies corresponding to the Fourier coefficients of a sampled signal are multiples of the sampling rate divided by the length of the frames used in the Fourier transformation.

According to the invention, the watermark in the frequency domain is substantially specified at frequencies which correspond to multiples of a predetermined constant scaling factor. Consequently, a watermark detector may reproduce these frequencies by selecting a proper frame length based on the sampling rate and the scaling factor. Furthermore, since the scaling factor is derived from a common divisor of a set of sampling rates and, preferably, is substantially equal to the common divisor divided by the predetermined integral factor, it is ensured that the calculated frame length is an integral number for all sampling rates of the selected set of sampling rates.

Therefore, the method according to the invention ensures that a detection algorithm using any one of the sampling rates of the set of sampling rates may retrieve samples of the watermark in the frequency domain at the same frequencies at which they were embedded by an embedder operating at any sampling rate of the predetermined set of sampling rates.

It is a further advantage of the invention that, in contrast to the above-mentioned prior art method, the detection algorithm does not need to know the sampling rate at which the watermark was embedded. Consequently, it is an advantage of the invention that it increases the flexibility of a watermarking scheme.

It is a further advantage of the invention that it yields a watermark which is robust against signal processing operations, i.e. the watermark may still be detected in a signal, even after the signal has been subject to such operations. In the field of audio signals, examples of such processing operations include compression, cropping, D/A and A/D conversion, equalization, temporal scaling, group delay distortions, filtering, and removal or insertion of samples.

It is an advantage of the invention that it overcomes the disadvantage of a decreased detection reliability of the alternative method of scaling the information signal in time prior to the detection process in order to compensate the difference in sampling rates.

In a preferred embodiment of the invention, the method further comprises the steps of calculating a first frame length by dividing the first sampling rate by the scaling factor;

dividing the information signal into a series of signal frames with respective frame lengths related to the calculated first frame length;

embedding a watermark in at least one signal frame of the series of signal frames to obtain a series of modified signal frames.

It is understood that the signal frames may overlap with their respective neighbouring signal frames. Furthermore, the lengths of the signal frames of the series of frames may be the same for all the frames, preferably substantially equal to the first frame length. Alternatively, different frame lengths may be used within the series of signal frames, e.g. different multiples of the calculated first frame length.

More preferably, the method further comprises the steps of transforming the signal frames into series of coefficients;
modifying said coefficients as a function of the watermark;
inversely transforming the series of modified coefficients to obtain the modified signal frames.

The step of transforming the signal frames may comprise the calculation of a Fourier transform. Correspondingly, the step of inversely transforming the modified coefficients may comprise the calculation of an inverse Fourier transform. Alternatively, other transformations may be used, instead of a Fourier transformation, for example a discrete cosine transform or a wavelet transform.

Even more preferably, the step of transforming the signal frames comprises the step of applying a mixed-radix Fast Fourier Transform algorithm.

It is an advantage of the above embodiments that they provide efficient methods of embedding the watermark even for frame lengths which are not powers of 2.

Further preferred embodiments are disclosed in the dependent claims.

The invention further provides a method of detecting a watermark, arrangements for embedding and detecting a watermark, an information signal having an embedded watermark, a storage medium having recorded thereon such a signal, and a device for processing multimedia content comprising an arrangement for detecting a watermark. The above-mentioned aspects of the invention are disclosed in the independent claims. As the advantages and preferred embodiments of these aspects of the invention correspond to the advantages and preferred embodiments of the method described above and in the following, these will not be repeated here.

The invention will be explained more fully below in connection with preferred embodiments and with reference to the drawings, in which.

Figure 1:
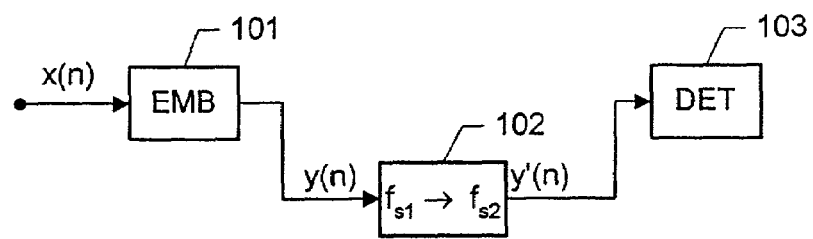
FIG. 1 shows a schematic diagram of a watermarking system according to an embodiment of the invention.

FIG. 1 shows a schematic view of a watermarking system according to the invention. The system comprises an embedder 101 which embeds a watermark in an information signal x(n), e.g. a digital audio signal, at a sampling rate $f_{s1}$. Subsequently, the watermarked signal y(n) may be subject to a sampling rate conversion process 102 which changes the sampling rate of the watermarked signal to $f_{s2}$. An example of a sampling rate conversion process is a D/A conversion and a subsequent A/D conversion using a different sampling rate. The resulting signal y'(n) is then analysed by a watermark detector 103. The embedder 101 implements a method of embedding a watermark where the watermark may be represented by a sequence of $N_1$ coefficients w(k), k=1, ..., $N_1$, in the frequency domain. For example, the coefficients may be a sequence of pseudo-random numbers with zero mean and variance 1. For example, as will be described in greater detail in connection with FIG. 2, the method implemented by the embedder may comprise the segmentation of the audio signal into frames of length $N_1$, the Fourier transforming of the frames, and a multiplication of the resulting $N_1$ Fourier coefficients with the watermark coefficients w(k). The detector 103 implements a method of detecting the watermark which comprises the calculation of a correlation between the watermark coefficients w(k) and a Fourier representation of the signal y'(n) of length $N_2$. An example of an arrangement for detecting a watermark according to an embodiment of the invention will be described in connection with FIG. 4.

According to the invention, it is realised that the Fourier coefficients of the sampled signal x(n), n=1, ..., N, are related to a frequency such that the frequency $F_k$ related to the k-th coefficient is $F_k = k \cdot f_s/N$, where $f_s$ is the sampling rate of the signal x(n) and N is the length of the sampling interval. In the above-mentioned example, N corresponds to the frame lengths $N_1$ and $N_2$ of the segmented information signal in the embedder and the detector, respectively. Hence, the frequency $F_k$ is a multiple of the index k with a factor of proportionality of $\Delta = f_s/N$. The scaling factor $\Delta$ may be interpreted as a grid size of the sampled signal.

As the detector 103 correlates the signal y'(n) with the watermark in the frequency domain, both the embedding and the detection algorithms should preferably use the same frequencies to embed and retrieve the watermark samples. Even though small deviations may be tolerable, a mismatch in frequencies decreases the detection performance. As the frequencies depend on the grid size $\Delta$, both algorithms should use matching grid sizes.

The sampling rate conversion 102 changes the sampling rate. If, for example, an audio signal with a sampling rate of $f_{s1}$=44100 Hz is applied to a watermark embedder with a frame length of 2048 samples, the frequencies corresponding to the Fourier coefficients are multiples of the grid size $\Delta_1 \approx 21.5$ Hz. If the signal is subject to a subsequent sampling rate conversion and converted to a signal with a sampling rate of $f_{s2}$=48000 Hz, and if the detection algorithm also uses a frame length of 2048 samples, the frequencies corresponding to the Fourier coefficients are multiples of $\Delta_2 \approx 23.4$ Hz. Consequently, the detection algorithm will use different frequencies than the embedding algorithm and the detection will fail.

Still referring to FIG. 1, according to the invention, the frame length $N_1$ used in the embedder is chosen to be $N_1 = m \cdot f_{s1}/\gcd(f_{s1}, f_{s2})$, where m is an integral factor and $\gcd(f_{s1}, f_{s2})$ is the greatest common divisor of the sampling rates $f_{s1}$ and $f_{s2}$ of the embedding and detection algorithm, respectively. The frame length used in the detector is chosen to be $N_2 = m \cdot f_{s2}/\gcd(f_{s1}, f_{s2})$. Hence, both the embedder and the detector correspond to the same grid size $\Delta = f_{s1}/N_1 = f_{s2}/N_2 = \gcd(f_{s1}, f_{s2})/m$. In the above example, where $f_{s1}$=441000 Hz and $f_{s2}$=48000 Hz, the greatest common divisor is $\gcd(f_{s1}, f_{s2})$=300 and, therefore, $N_1$=147 m and $N_2$=160 m. The following table summarises the resulting frame lengths for some possible values of m:

| m | $N_1$ | $N_2$ |
|---|---|---|
| 1 | 147 | 160 |
| 2 | 294 | 320 |
| 14 | 2058 | 2240 |

Hence, even with the constraint of a matching grid size, a number of different frame lengths are possible and may be selected by choosing different values of m. Large values of m correspond to large frame sizes allowing a large watermark payload. Small frame sizes, on the other hand, correspond to a lower complexity of the embedding and detection algorithms, smaller distortions of the information signal, and smaller delays introduced by the embedder and detector.

It should be noted that, in the above example, the number of watermark coefficients w(k) was assumed to be equal to the frame length $N_1$ at the embedder. Alternatively, the watermark which is stored both at the embedder and the detector may comprise a number $N_w$ of watermark coefficients w(k) where $N_w$ may be different from $N_1$ and/or $N_2$. In this case, the $\min(N_1, N_w)$ low-frequency coefficients of w(k) may be embedded at the embedder and, at the detector, the $\min(N_1, N_2, N_w)$ low-frequency coefficients contribute to the calculated correlation. For a given range of possible values of $N_1$ and $N_2$, a value of $N_w$ may be chosen as a trade-off between computational complexity and detection reliability.

In the example of FIG. 1, the watermarking scheme was constructed to be compatible with two sampling rates. In the case where the watermarking scheme should be compatible with a set of n sampling rates $f_{s1}, \ldots, f_{sn}$, the frame lengths corresponding to these sampling rates are selected as $N_i = m \cdot f_{si} / \gcd(f_{s1}, \ldots, f_{sn})$, for $i=1, \ldots, n$, where $\gcd(f_{s1}, \ldots, f_{sn})$ is the greatest common divisor of the sampling rates $f_{s1}, \ldots, f_{sn}$. For example, the sampling rates listed in the left column of the following table are examples of commonly used sampling rates in the field of digital audio recording, processing or playback:

| $f_s$ in Hz | N | factorisation |
|---|---|---|
| 6000 | 240 m | $2^4 \cdot 3 \cdot 5 \cdot m$ |
| 8000 | 320 m | $2^6 \cdot 5 \cdot m$ |
| 11025 | 441 m | $3^2 \cdot 7^2 \cdot m$ |
| 16000 | 640 m | $2^7 \cdot 5 \cdot m$ |
| 22050 | 882 m | $2 \cdot 3^2 \cdot 7^2 \cdot m$ |
| 24000 | 960 m | $2^6 \cdot 3 \cdot 5 \cdot m$ |
| 32000 | 1280 m | $2^8 \cdot 5 \cdot m$ |
| 44100 | 1764 m | $2^2 \cdot 3^2 \cdot 7^2 \cdot m$ |
| 48000 | 1920 m | $2^7 \cdot 3 \cdot 5 \cdot m$ |
| 64000 | 2560 m | $2^9 \cdot 5 \cdot m$ |
| 88200 | 3528 m | $2^3 \cdot 3^2 \cdot 7^2 \cdot m$ |
| 96000 | 3840 m | $2^8 \cdot 3 \cdot 5 \cdot m$ |
| 192000 | 7680 m | $2^9 \cdot 3 \cdot 5 \cdot m$ |
| 2822400 | 112896 m | $2^8 \cdot 3^2 \cdot 7^2 \cdot m$ |

It is noted that the list comprises frequencies which are multiples or fractions of the CD sampling rates 44100 Hz and 48000 Hz as well as multiples of 8000 Hz. The greatest common divisor of these frequencies is 25 and the corresponding relative frame lengths are listed in the centre column of the above table. The relative frame lengths are listed as multiples of a common factor m. Different sets of absolute frame lengths may be obtained by choosing different values m. Hence, in a system which implements these relative frame lengths, the watermarking is robust against sampling rate conversions between frequencies of the corresponding set of frequencies, i.e. even though a sampling rate conversion is preformed on the watermarked signal, the watermark may still be reliably detected. In the right column of the above table, the factorisations of the frame length N are listed. It should be noted that, as the frame lengths factorise into small factors, in the above examples 2, 3, 5, and 7, efficient mixed radix Fast Fourier Transform (FFT) schemes may be used to calculate the Fourier transform of the segmented signal x(n).

If, as another example, a given watermarking application does not involve frequencies from the above table which are below 32000 Hz, the greatest common divisor of the remaining frequencies is 100. This situation is summarised in the following table:

| $f_s$ in Hz | N | factorisation |
|---|---|---|
| 32000 | 320 m | $2^6 \cdot 5 \cdot m$ |
| 44100 | 441 m | $3^2 \cdot 7^2 \cdot m$ |
| 48000 | 480 m | $2^5 \cdot 3 \cdot 5 \cdot m$ |
| 64000 | 640 m | $2^7 \cdot 5 \cdot m$ |
| 88200 | 882 m | $2 \cdot 3^2 \cdot 7^2 \cdot m$ |
| 96000 | 960 m | $2^6 \cdot 3 \cdot 5 \cdot m$ |
| 192000 | 1920 m | $2^7 \cdot 3 \cdot 5 \cdot m$ |
| 2822400 | 28224 m | $2^6 \cdot 3^2 \cdot 7^2 \cdot m$ |

It should be noted that the other embedding methods may be used within the scope of the invention. Another example of such a method which will be described in greater detail in connection with FIG. 3 comprises the calculation of a convolution of the audio signal with a limited-support watermark signal of length $N_1$ which may be represented by its Fourier coefficients w(k), $k=1, \ldots, N_1$. Even though this example does not comprise a segmentation of the audio signal into frames, it still involves the intrinsic length $N_1$.

Figure 2:
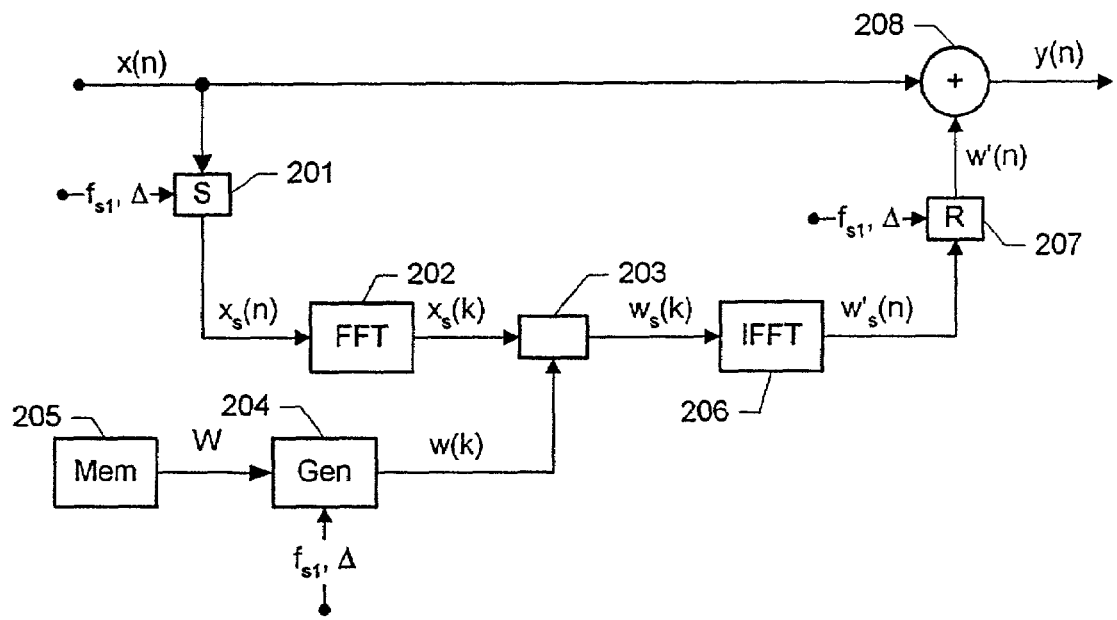
FIG. 2 shows a schematic diagram of an arrangement for embedding a watermark according to a first embodiment of the invention.

FIG. 2 shows a schematic diagram of an arrangement for embedding a watermark according to a first embodiment of the invention. The arrangement comprises a division circuit 201 which divides the incoming information signal x(n) into frames of length N. The resulting frames $x_s(n)$ are applied to a Fast Fourier Transform circuit 202 which transforms the signal segments $x_s(n)$ to the Fourier domain resulting in a sequence of Fourier coefficients $x'_s(k)$. Each Fourier coefficient $x'_s(k)$ is related to a frequency, such that the frequency $F_k$ related to the k-th coefficient $x'_s(k)$ is $F_k = k \cdot f_{s1}/N$, where N is the frame length and $f_{s1}$ is the sampling rate of the signal x(n). Subsequently, the Fourier coefficients $x'_s(k)$ are modified by a watermark calculation module 203 as a function of a watermark sequence w(k), e.g. by multiplying w(k) with $x'_s(k)$ and scaling the result with a scaling factor. The watermark sequence w(k) is generated by a watermark generation circuit 204 on the basis of a secret watermark W. The arrangement further comprises a storage medium 205, preferably a read-only memory which cannot be interrogated, in which the watermark W is stored. The resulting scaled watermark samples $w_s(k)$ are applied to the inverse Fast Fourier transform circuit 206 which transforms the sequence of coefficients $w_s(k)$ back to sequences of signal samples $w_s'(n)$. The watermarks $w_s'(n)$ are applied to a reconstruction circuit 207 which generates the watermark w'(n) from the watermark segments $w_s'(n)$. Finally, the watermark w'(n) is added to the original audio signal x(n) by the summing circuit 208 to obtain the watermarked audio signal y(n)=x(n)+w'(n). Alternatively, the watermark signal w'(n) may be combined with the audio signal x(n) using a different function, e.g. a subtraction or an XOR function in the case of a 1-bit audio format.

According to this embodiment of the invention, the frame length N is adapted to the sampling rate $f_{s1}$ such that the grid size is the same as the grid size to be used during a subsequent detection of the watermark, as was described in connection with FIG. 1.

Figure 3:
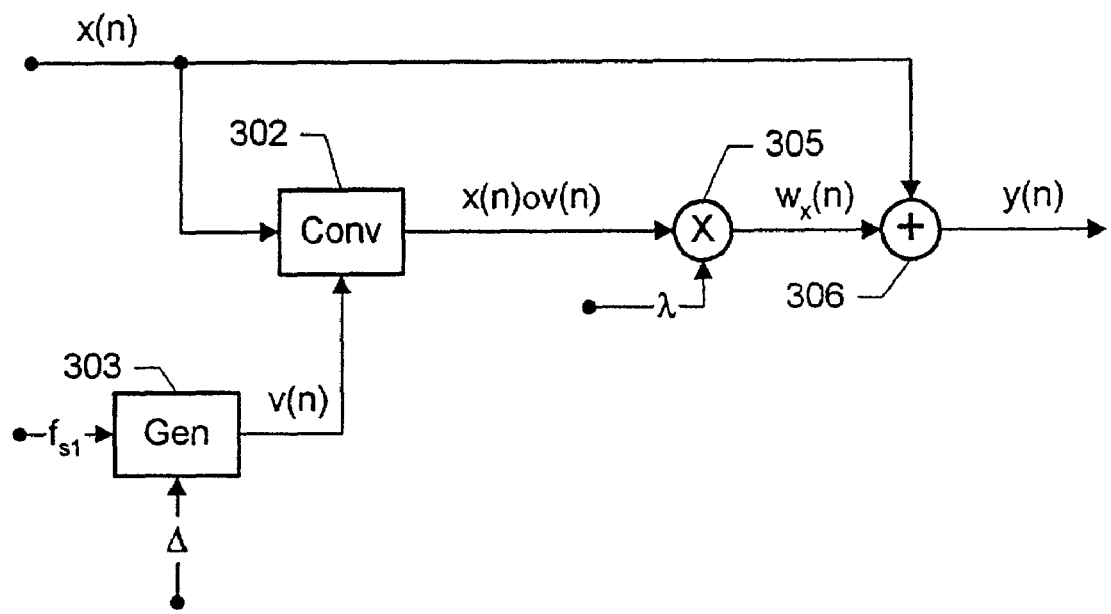
FIG. 3 shows a schematic diagram of an arrangement for embedding a watermark according to a second embodiment of the invention.

FIG. 3 shows a schematic diagram of an arrangement for embedding a watermark according to a second, non-frame-based embodiment of the invention. Instead of dividing the information signal x(n) into frames, the arrangement comprises a convolution circuit 302 which calculates a convolution $x(n) \circ v(n) = \Sigma_k x(n-k) \cdot v(k)$ of x(n) with a key sequence v(n) representing the watermark. The key sequence v(n) is generated by the generation circuit 303, preferably an inverse Fourier transform of a watermark sequence w(k), k=1, ..., N. Hence, the frequency spectrum of v(n) is determined at a set of frequencies which are multiples of the index k. Hence, according to this embodiment, the length N of the sequence v(n) is determined so as to match the grid size parameter $\Delta$ of the embedder and the detector as described in connection with FIG. 1. According to this embodiment, the watermarked signal y(n) is calculated according to $x(n) \to y(n) = x(n) \circ [1 + \lambda \cdot v(n)]$, where $\lambda$ is a predetermined embedding strength. Correspondingly, the arrangement of FIG. 3 further comprises a multiplication circuit 305 which multiplies the samples of the convolution $x(n) \circ v(n)$ with the embedding strength $\lambda$, and a summing circuit 306 which adds the resulting watermark signal $w_x(n) = \lambda x(n) \circ v(n)$ to the information signal x(n), resulting in the watermarked signal y(n).

The subsequent watermark detection may, for example, use a Symmetrical Phase Only Matched Filtering (SPOMF) technique where the detection algorithm also comprises a segmentation of the signal to be analysed.

Figure 4:
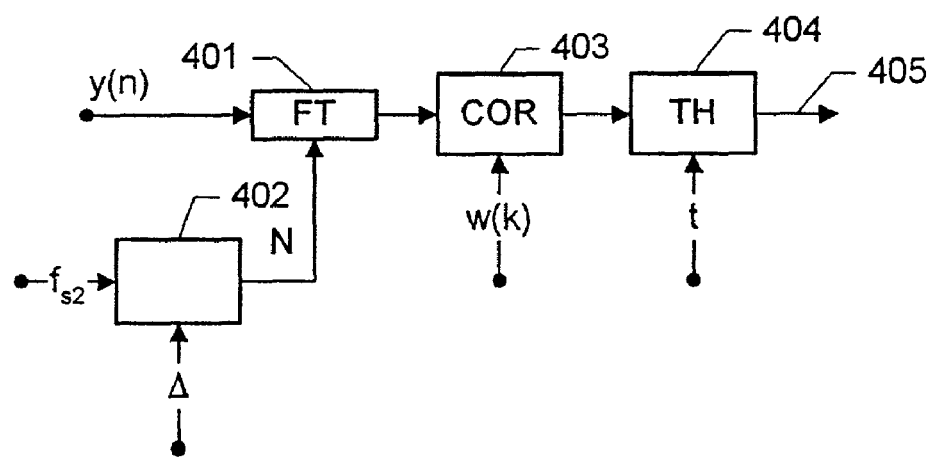
FIG. 4 shows a schematic diagram of an arrangement for detecting a watermark according to an embodiment of the invention.

FIG. 4 shows a schematic diagram of an arrangement for detecting a watermark according to an embodiment of the invention. The arrangement comprises a Fourier transform circuit 401 which calculates Fourier transforms of frames of the information signal y(n) to be analysed for a watermark. According to the invention, the length N of the frames is calculated by the circuit 402 on the basis of the sampling rate of the signal y(n) and the grid size $\Delta$ calculated according to the invention, preferably according to the embodiment of FIG. 1. The output of the Fourier transform circuit 401 is applied to a correlation circuit 403 which calculates a correlation of the Fourier coefficients with a watermark sequence w(k). Subsequently, in the thresholding circuit 404, a dominant peak in the correlation spectrum is identified and its size is compared to a predetermined threshold value t, resulting in a control signal 405 indicating the presence or absence of the watermark and/or the payload of the watermark.

It should be noted that the frame lengths used in the embedder and detector should, preferably, be substantially equal to the calculated frame lengths according to the method described above. However, small deviations from the optimal frame length do not necessarily cause the watermark detection to fail, but merely cause a decrease in detection reliability. It may be desirable to accept a slightly decreased detection reliability, if the implementation of the embedder or detector may be simplified due to a slightly suboptimal choice of the frame length. For example, if the optimal frame length is only slightly different from a power of 2, the power of two may be chosen as a frame length in order to achieve a particularly efficient Fast Fourier Transform algorithm, e.g. a radix-2 algorithm. Another example where a suboptimal frame length may be selected is in cases where the sampling rates are non-integral numbers or mutually prime, such that the greatest common divisor is 1. In order to reduce the sensitivity to small deviations from the optimal frame length, so-called scale searching methods may be used in the detector. However, these methods may cause a higher rate of false positive detections.

It should further be noted that, instead of using the greatest common divisor of the set of sampling rates, any other common divisor, preferably different from 1, may be used. However, the use of the greatest common divisor provides the greatest flexibility in choosing a set of frame lengths by selecting a value of the factor m.

It is further understood that the above arrangements for the embedding and detection of a watermark according to the invention may be implemented by any processing unit, e.g. a programmable microprocessor, an application-specific integrated circuit, or another integrated circuit, a smart card, or the like.

The watermark and/or the watermark signal may be stored in a storage medium. Examples of such storage media include magnetic tape, optical disc, digital video disk (DVD), compact disc (CD or CD-ROM), mini-disc, hard disk, floppy disk, ferro-electric memory, electrically erasable programmable read only memory (EEPROM), flash memory, EPROM, read only memory (ROM), static random access memory (SRAM), dynamic random access memory (DRAM), synchronous dynamic random access memory (SDRAM), ferromagnetic memory, optical storage, charge coupled devices, smart cards, etc.

It should finally be noted that even though the invention has primarily been described in connection with an audio signal, the scope of the invention is not restricted to audio signals. It is understood that the invention may also be applied to other information signals, such as multimedia signals, video signals, animations, graphics, still images, or the like.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

In summary, disclosed are methods of embedding and detecting a watermark in an information signal (x(n), y'(n)) which are robust against sampling rate conversions of the watermarked signal (y(n)). The frame lengths used by the embedder and the detector, respectively, are adapted so as to preserve a constant ratio between the respective sampling rate and frame length. The frame lengths may be calculated from a greatest common divisor of a set of sampling rates providing watermarks which are robust against sampling rate conversions between any sampling rates of the set of sampling rates.

The invention claimed is:

1. A method of embedding a watermark (W) in an information signal (x(n)) sampled at a first sampling rate ($f_{s1}$), in which the watermark is to be detected at at least a second sampling rate ($f_{s2}$), the method comprising the acts of:

generating a representation of the watermark corresponding to a frequency spectrum having predetermined values (w(k)) indicative of the watermark at a set of frequencies corresponding to integral multiples of a scaling factor ($\Delta$); and embedding the representation of the watermark in the information signal; wherein the scaling factor is derived from a first common divisor of a predetermined set of sampling rates comprising the first and second sampling rates, divided by a predetermined integral factor.

2. The method according to claim 1, further comprising the acts of:
  calculating a first frame length by dividing the first sampling rate by the scaling factor;
  dividing the information signal into a series of signal frames ($x_s(n)$) with respective frame lengths related to the calculated first frame length;
  embedding a watermark in at least one signal frame of the series of signal frames to obtain a series of modified signal frames ($w'_s(n)$).

3. The method according to claim 2, further comprising the acts of:
  transforming the signal frames into series of coefficients ($x_s(k)$);
  modifying said coefficients as a function of the watermark;
  inversely transforming the series of modified coefficients ($w_s(k)$) to obtain the modified signal frames.

4. The method according to claim 3, wherein the act of transforming the signal frames comprises the step of applying a mixed-radix Fast Fourier Transform algorithm.

5. The method according to claim 1, wherein the representation of the watermark is a watermark signal and wherein the act of embedding the representation of the watermark into the information signal comprises the act of calculating a convolution of the watermark signal with the information signal.

6. The method according to claim 1, wherein the first set of sampling rates comprises at least one sampling rate selected from the group of sampling rates containing 6000 Hz, 8000 Hz, 11025 Hz, 16000 Hz, 22050 Hz, 24000 Hz, 32000 Hz, 44100 Hz, 48000 Hz, 64000 Hz, 88200 Hz, 96000 Hz, 192000 Hz, 28222400 Hz.

7. The method according to claim 1, wherein the information signal comprises a multimedia signal, selected from the class of multimedia signals including audio signals, still image signals, arid video signals.

8. The method according to claim 1, wherein the first common divisor is a greatest common divisor of the set of sampling rates.

9. A method of detecting a watermark in an information signal ($y(n)$) sampled at a first sampling rate ($f_{s2}$), the watermark having been embedded at a second sampling rate, the method comprising the acts of:
  calculating a first frame length (N) by multiplying the first sampling rate by a predetermined scale factor corresponding to a predetermined integral factor divided by a first common divisor of a set of sampling rates comprising the first and second sampling rates;
  dividing the information signal into signal frames with a length corresponding to the calculated first frame length;
  determining a correlation between the watermark and a series of coefficients derived from said signal frames; and
  detecting whether said correlation exceeds a predetermined value (t).

10. An arrangement for embedding a watermark in an information signal sampled at a first sampling rate, in which the watermark is to be detected at least a second sampling rate, the arrangement comprising:
  means for generating a representation of the watermark corresponding to a frequency spectrum having predetermined values indicative of the watermark at a set of frequencies corresponding to integral multiples of a scaling factor; and
  means for embedding the representation of the watermark in the information signal; wherein
  the scaling factor is derived from a first common divisor of a predetermined set of sampling rates comprising the first and second sampling rates, divided by a predetermined integral factor.

11. An arrangement for detecting a watermark in an information signal sampled at a first sampling rate, the watermark having been embedded at a second sampling rate, the arrangement comprising:
  means for calculating a first frame length by multiplying the first sampling rate by a predetermined scale factor corresponding to a predetermined integral factor divided by a first common divisor of a set of sampling rates comprising the first and second sampling rates;
  means for dividing the information signal into signal frames with a length corresponding to the calculated first frame length;
  means for determining a correlation between the watermark and a series of coefficients derived from said signal frames; and
  means for detecting whether said correlation exceeds a predetermined value.

12. A device for processing multimedia content, the multimedia content being included in an information signal sampled at a first sampling rate, the device comprising an arrangement for detecting a watermark signal in the information signal, the watermark having been embedded at a second sampling rate, the arrangement including:
  means for calculating a first frame length by multiplying the first sampling rate by a predetermined scale factor corresponding to a predetermined integral factor divided by a first common divisor of a set of sampling rates comprising the first and second sampling rates;
  means for dividing the information signal into signal frames with a length corresponding to the calculated first frame length;
  means for determining a correlation between the watermark and a series of coefficients derived from said signal frames; and
  means for detecting whether said correlation exceeds a predetermined value.

13. A device for transmitting an information signal, the device comprising an arrangement for embedding a watermark in the information signal, the information signal being sampled at a first sampling rate, in which the watermark is to be detected at at least a second sampling rate, the arrangement including:
  means for generating a representation of the watermark corresponding to a frequency spectrum having predetermined values indicative of the watermark at a set of frequencies corresponding to integral multiples of a scaling factor; and
  means for embedding the representation of the watermark in the information signal; wherein
  the scaling factor is derived from a first common divisor of a predetermined set of sampling rates comprising the first and second sampling rates, divided by a predetermined integral factor.

* * * * *